United States Patent
Wang et al.

(10) Patent No.: US 10,805,023 B2
(45) Date of Patent: Oct. 13, 2020

(54) SYSTEMS AND METHODS FOR MEASURING WIRELESS SIGNAL QUALITY

(71) Applicant: PC-TEL, Inc., Bloomingdale, IL (US)

(72) Inventors: Gang Wang, Germantown, MD (US); Wei Zha, Boyds, MD (US)

(73) Assignee: PC-TEL, INC., Bloomingdale, IL (US)

( * ) Notice: Subject to any disclaimer, the term of this patent is extended or adjusted under 35 U.S.C. 154(b) by 0 days.

(21) Appl. No.: 16/293,938

(22) Filed: Mar. 6, 2019

(65) Prior Publication Data

US 2020/0287640 A1    Sep. 10, 2020

(51) Int. Cl.
*H04W 24/00* (2009.01)
*H04B 17/373* (2015.01)
*H04J 1/16* (2006.01)
*H04B 17/336* (2015.01)
*H04W 24/10* (2009.01)

(52) U.S. Cl.
CPC ......... *H04B 17/373* (2015.01); *H04B 17/336* (2015.01); *H04J 1/16* (2013.01); *H04W 24/10* (2013.01)

(58) Field of Classification Search
CPC ... H04L 1/0079; H04L 27/26; H04L 27/2605; H04L 27/2613; H04L 27/2647; H04L 27/3809; H04L 41/22; H04L 43/0847; H04L 43/16; H04L 63/1425; H04L 63/1433; H04W 12/00503; H04W 12/1201; H04W 4/90
See application file for complete search history.

(56) References Cited

U.S. PATENT DOCUMENTS

| 2006/0094365 | A1* | 5/2006 | Inogai | H04B 17/0087 455/67.11 |
| 2017/0080229 | A1* | 3/2017 | Meister | A61N 1/36036 |
| 2017/0338993 | A1* | 11/2017 | Guo | H04L 27/2647 |

(Continued)

FOREIGN PATENT DOCUMENTS

WO    99/40689 A1    8/1999

OTHER PUBLICATIONS

Gang Wang et al., Multi-Carrier Transmission for Hybrid Radio Frequency with Optical Wireless Communications, Sensors and Systems for Space Applications VIII, Proc. of SPIE vol. 9469, 94690C—© 2015 SPIE.

(Continued)

*Primary Examiner* — Phuc H Tran
(74) *Attorney, Agent, or Firm* — Husch Blackwell LLP

(57) ABSTRACT

Systems and methods are provided for calculating a SINR measurement for an oversampled P25 C4FM wireless signal received by P25 user equipment or a P25 receiver to determine whether a P25 network and the P25 user equipment or the P25 receiver have been successfully deployed. Some methods can include calculating a first order envelop mean value for the oversampled wireless signal, calculating a second order envelop mean value for the oversampled wireless signal, calculating a fourth order envelop mean value for the oversampled wireless signal, using the fourth order envelop mean value and the second order envelop mean value to estimate the SINR measurement, and using the first order envelop mean value and the second order envelop mean value to refine the SINR measurement.

20 Claims, 5 Drawing Sheets

(56) References Cited

U.S. PATENT DOCUMENTS

2019/0190942 A1* 6/2019 Drummond .......... H04B 17/336

OTHER PUBLICATIONS

Gang Wang et al., Cyber Security with Radio Frequency Interferences Mitigation Study for Satellite Systems, Sensors and Systems for Space Applications IX, Proc. of SPIE vol. 9838, 98380K—© 2016 SPIE.
Extended European search report from corresponding EP patent application 20161163.9 dated Jul. 22, 2020.
Ju-Ya Chen et al., "Autocorrelation Based Signal-to-Noise Ratio Estimator in AWGN Channels", 2007 IEEE International Symposium On Signal Processing and Information Technology, Piscataway, NJ, USA, pp. 570-574, Dec. 15, 2007.

* cited by examiner

SYSTEMS AND METHODS FOR MEASURING WIRELESS SIGNAL QUALITY

FIELD

The present invention relates generally to wireless communication. More particularly, the present invention relates to systems and methods for measuring wireless signal quality.

BACKGROUND

Project 25 (P25) is a suite of standards for digital mobile radio communication designed for use by public safety organizations in North America. Phase 1 of P25 uses a frequency-division multiple access (FDMA) protocol, and P25 radios dominantly use continuous 4 level frequency modulation (C4FM) in wireless transmissions. As is known in the art, C4FM is an analog modulation scheme that uses four different frequency deviations (e.g. +1800 Hz, +600 Hz, −600 Hz, and −1800 Hz) to represent two bits of communication input (i.e. a symbol), C4FM signals are transmitted at 4800 symbols per second, the modulation scheme applies to an entire frame, including a preamble and traffic, and a P25 C4FM modulated waveform of a P25 C4FM signal has a constant envelop.

Conventional systems and methods have difficulty accurately calculating a signal-to-interference-plus-noise ratio (SINR) for a P25 C4FM signal because conventional systems and methods calculate the SINR based on an out-of-band noise power measurement and an in-band signal power measurement. However, the out-of-band noise power measurement and the in-band signal power measurement provide inaccurate and unreliable SINR measurements for a P25 C4FM modulated waveform because the out-of-band noise power measurement varies with time and changes with a device's temperature and because the out-of-band noise power measurement cannot differentiate between in-band signal power and in-band interference power.

In view of the above, there is a continuing, ongoing need for improved systems and methods.

DETAILED DESCRIPTION

Figure 1:
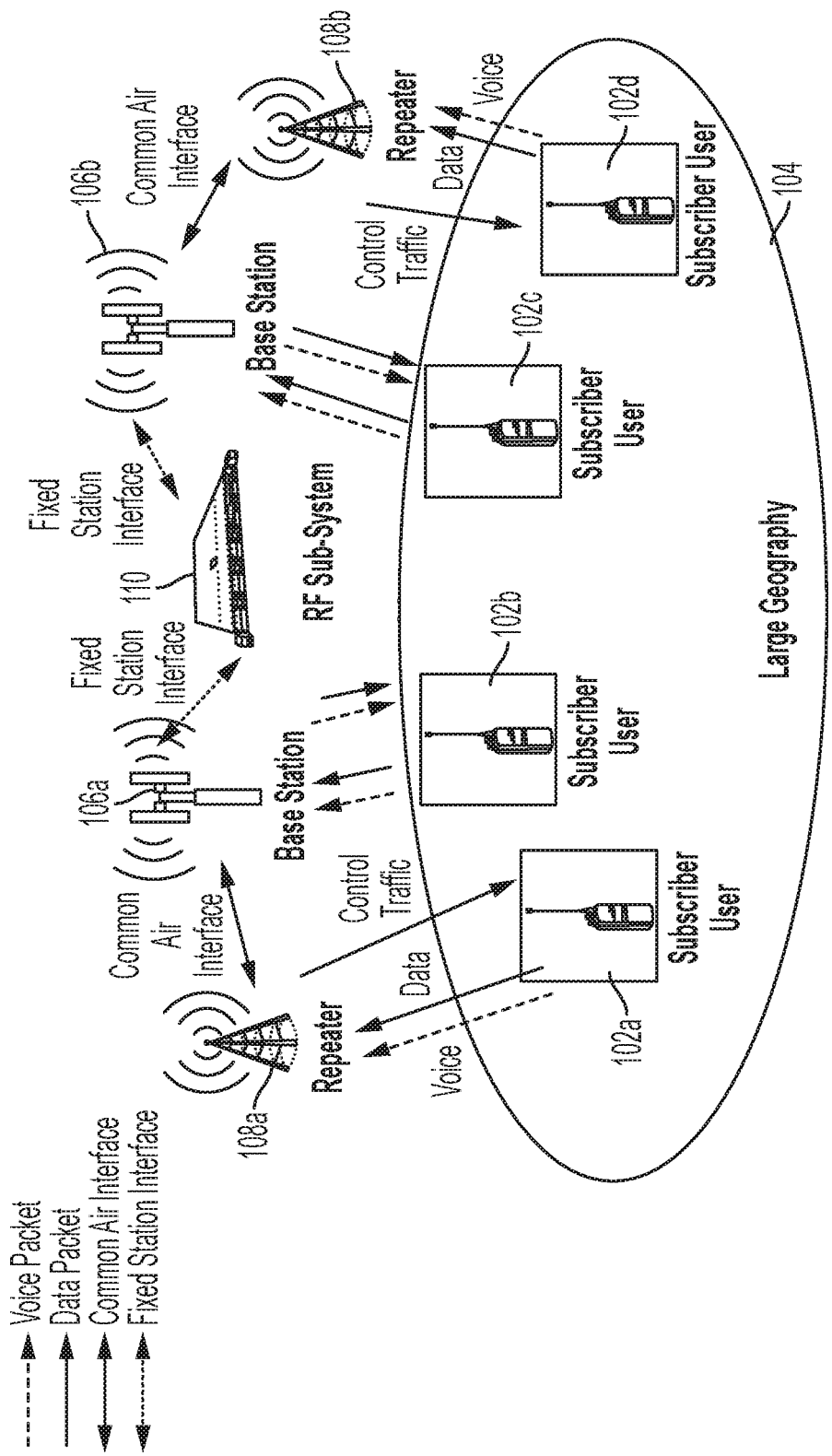
FIG. 1 is a diagram of a system in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for calculating a SINR for a P25 C4FM wireless signal (i.e. uplink or downlink) to determine whether a P25 network and P25 user equipment or a P25 receiver have been successfully deployed. In some embodiments, the P25 user equipment or the P25 receiver can execute a SINR calculation as described herein. Additionally or alternatively, in some embodiments, a P25 base station can execute the SINR calculation as described herein.

Embodiments disclosed herein can leverage a constant nature of a P25 C4FM waveform of the P25 C4FM wireless signal to obtain signal statistical information by using signal statistic processing to calculate an SINR measurement for the P25 C4FM wireless signal. For example, embodiments disclosed herein can oversample the P25 C4FM wireless signal, correlate the P25 C4FM wireless signal as oversampled with a frame synchronization pattern, and calculate a first order envelop mean value for the P25 C4FM waveform, a second order envelop mean value for the P25 C4FM waveform, and a fourth order envelop mean value for the P25 C4FM waveform. In some embodiments, systems and methods disclosed herein can use the second order envelop mean value and the fourth order envelop mean value to generate an SINR estimate and can use the first order envelop mean value and the second order envelop mean value to refine the SINR estimate to obtain the SINR measurement for the P25 C4FM wireless signal.

FIG. 1 is a diagram of a system 100 in accordance with disclosed embodiments. As shown in FIG. 1, the system 100 can include a plurality of user devices 102a-102d, each of which can be located in a respective location within a geographic area 104. In some embodiments, each of the plurality of user devices 102a-102d can include a respective P25 radio configured to send and receive P25 wireless communication.

The plurality of user devices 102a-102d can receive the P25 wireless communication from base stations 106a, 106b or repeaters 108a, 108b and can transmit the P25 wireless communication to the base stations 106a, 106b or the repeaters 108a, 108b. In some embodiments, the P25 wireless communication can originate from an RF subsystem 110, and in some embodiments, the base stations 106a, 106b and/or the repeaters 108a, 108b can relay the P25 wireless communication to one of the plurality of user devices 102a-102d or the RF subsystem 110. For example, in some embodiments, a first of the plurality of user devices 102a can transmit either voice or data of the P25 wireless communication to a second of the plurality of user devices 102b via a first repeater 108a or a first base station 106a or both.

Figure 2:
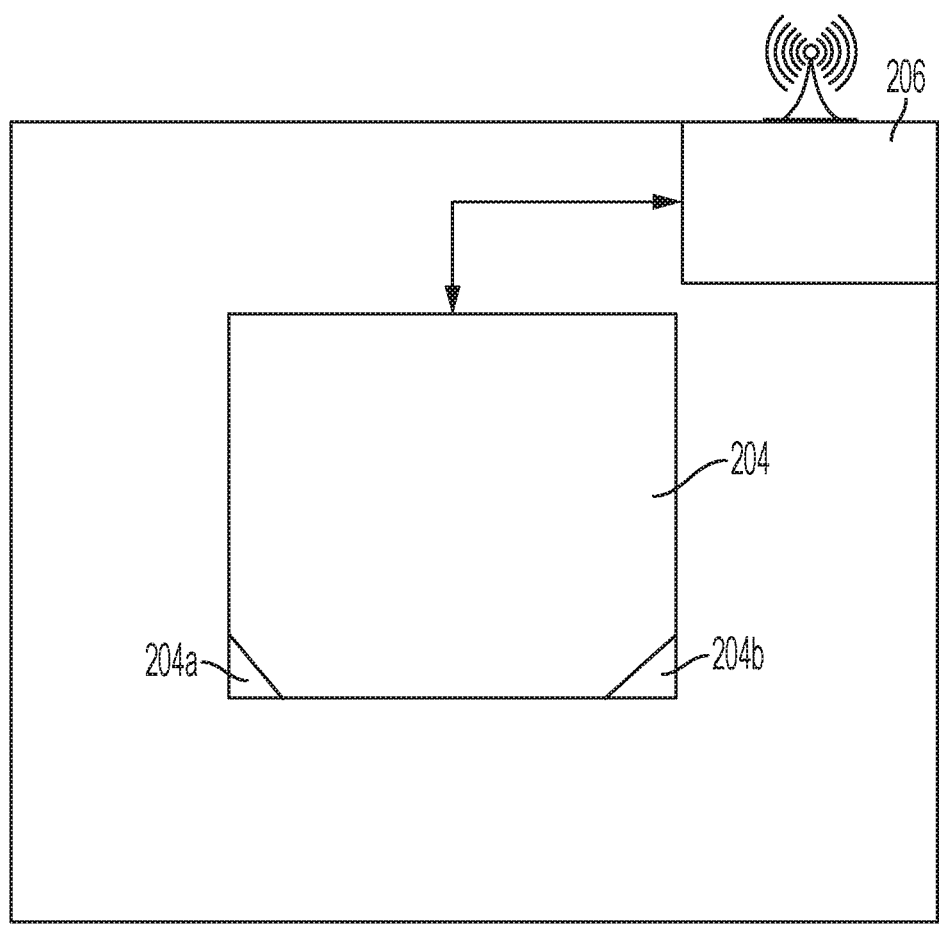
FIG. 2 is a block diagram of a user device in accordance with disclosed embodiments.

FIG. 2 is a block diagram of a user device 200 (e.g. any of the plurality of user devices 102a-102d) in accordance with disclosed embodiments. As shown in FIG. 2, the user device 200 can include control circuitry 204, which can include one or more programmable processors 204a and executable control software 204b as would be understood by one of ordinary skill in the art. The executable control software 204b can be stored on a transitory or non-transitory computer readable medium, including, but not limited to local computer memory, RAM, optical storage media, magnetic storage media, and the like, and in some embodiments, the control circuitry 204, the programmable processors 204a, and the executable control software 204b can execute and control some of the methods disclosed herein.

The user device 200 can also include a wireless communication interface 206. For example, the wireless communication interface 206 can include an antenna and corresponding communication hardware as would be understood by one of ordinary skill in the art for sending and receiving the P25 wireless communication.

The P25 wireless communication received by the user device 200 can include a P25 C4FM wireless signal, which can include a P25 C4FM waveform, which can be represented as follows:

$$y(nT_s) = \sqrt{S} \exp(i2\pi f_\Delta nT_s)\exp\left(i2\pi K_f \int_0^{nT_s} x_m(\tau)d\tau\right) + \sqrt{N}\, z(nT_s)$$

where $y(nT_s)$ is a received C4FM signal sample at an n-th sampling time instant at the user device 200, $T_s$ is a sampling period, $x_m(\bullet)$ is a quantized and filtered signal at a transmitter, $z(nT_s)$ is additive white Gaussian noise (AWGN) at the n-th sampling time instant following a standard normal distribution, $f_\Delta$ is a frequency offset error or frequency offset residual error between the user device 200 and the transmitter, $K_f$ is frequency modulator sensitivity, S is desired C4FM signal power, and N is C4FM noise power. For an over-sampling system, $T_s < T_{sym}$ where $T_{sym}$ is a transmitted symbol period. As explained herein, systems and methods disclosed herein can use the P25 C4FM waveform to calculate an SINR measurement for the P25 C4FM wireless signal and determine whether a P25 network and a P25 receiver (e.g. the user device 200) has been successfully deployed.

Figure 3:
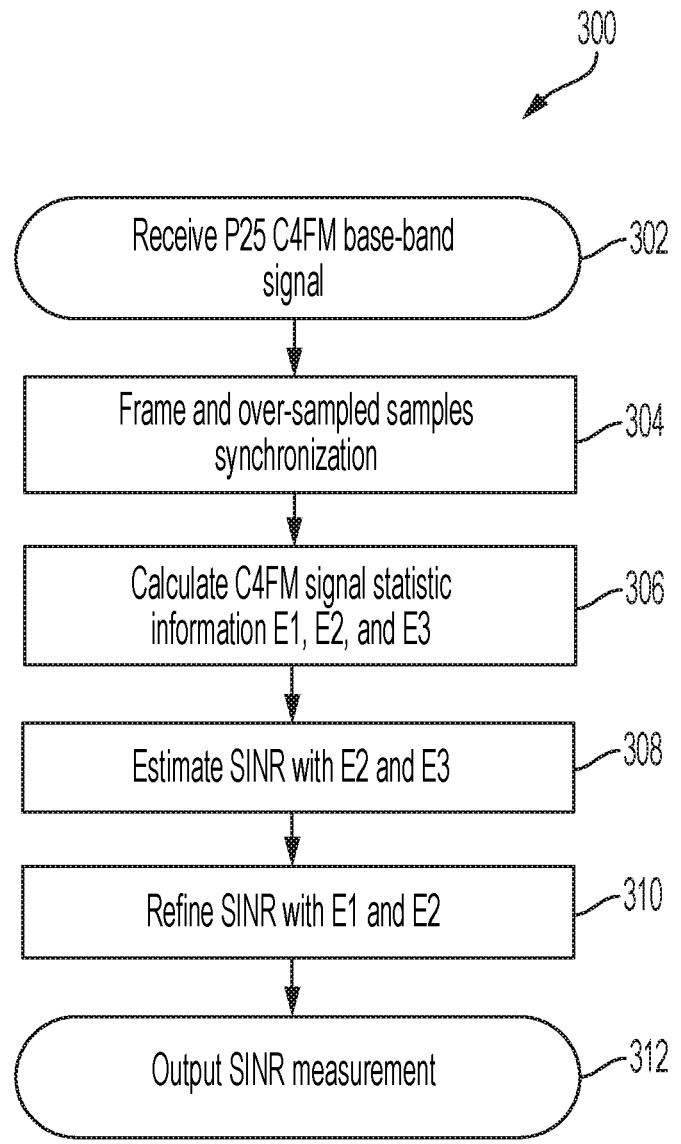
FIG. 3 is a flow diagram of a method in accordance with disclosed embodiments.

FIG. 3 is a flow diagram of a method 300 in accordance with disclosed embodiments. As shown in FIG. 3, the method 300 can include a user device (e.g. the user device 200) receiving a wireless signal as in 302 and the user device synchronizing a frame pattern of the wireless signal to identify frame and symbol timing as in 304. In some embodiments, the user device can execute frame synchronization as in 304 to identify the wireless signal, and in these embodiments, the user device can synchronize the frame pattern of the wireless signal as in 304 for both a SINR calculation and signal decoding. Furthermore, in some embodiments, the wireless signal can include a P25 C4FM wireless signal, and in these embodiments, the user device can synchronize the frame pattern as in 304 by correlating an oversampled version of the P25 C4FM wireless signal with a known 24-symbol frame synchronization pattern presented at a start of every frame of the P25 C4FM wireless signal.

Figure 5:
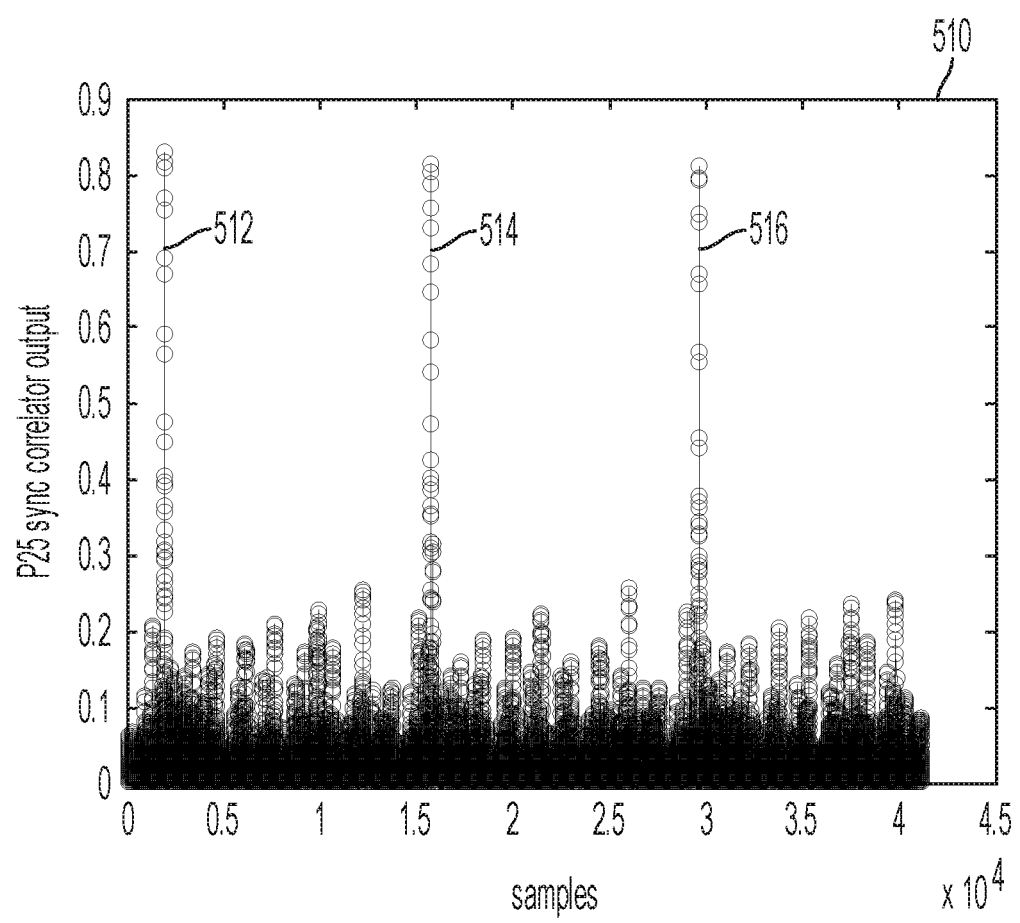
FIG. 5 is a graph illustrating correlation results of oversampled frames of a wireless signal in accordance with disclosed embodiments.

For example, the frame synchronization as in 304 can include the user device identifying a peak location of a correlated output of the oversampled version of the P25 C4FM wireless signal with the known 24-symbol frame synchronization pattern. In this regard, FIG. 5 is a graph 510 illustrating three correlation peaks 512, 514, 516, which represent beginnings of three frames of the P25 C4F wireless signal. FIG. 5 illustrates an oversampling rate of 16 for illustration purposes, but systems and methods disclosed herein are not so limited and can include other oversampling rates.

Referring again to FIG. 3, after synchronizing the frame pattern of the wireless signal as in 304, the method 300 can include the user device calculating a first order envelop mean value ($E_1$), a second order envelop mean value ($E_2$), and a fourth order envelop mean value ($E_3$) for a P25 C4FM waveform of the P25 C4FM wireless signal as in 306.

In some embodiments, systems and methods disclosed herein can calculate the first order envelop mean value ($E_1$) with $N_s$ received samples as follows:

$$E_1 \triangleq E[|y|] = \sqrt{N\pi/2}\, \exp\left(-\frac{S}{2N}\right)\left[\left(1+\frac{S}{N}\right)I_0\left(\frac{S}{2N}\right) + \frac{S}{N}I_1\left(\frac{S}{2N}\right)\right]$$

where S is a true signal power, N is a true noise power, $I_0(\bullet)$ is a Bessel function of the first kind with order 0, $I_1(\bullet)$ is a Bessel function of the first kind with order 1, and y is a column vector composed of $y(nT_s)$.

Furthermore, in some embodiments, systems and methods disclosed herein can calculate the second order envelop mean value ($E_2$) as follows:

$$E_2 \triangleq \frac{1}{N_s} E[y^H y] = S + N$$

where $(\bullet)^H$ represents a Hermitian transpose operator.

Further still, in some embodiments, systems and methods disclosed herein can calculate the fourth order envelop mean value ($E_3$) as follows:

$$E_3 \triangleq \frac{1}{N_s} E[(y^H y)^2] = S^2 + 4SN + 2N^2$$

After calculating the first order envelop mean value ($E_1$), the second order envelop mean value ($E_2$), and the fourth order envelop mean value ($E_3$) for the P25 C4FM waveform as in 306, the method 300 can include the user device using the second order envelop mean value ($E_2$) and the fourth order envelop mean value ($E_3$) to estimate an initial signal power measurement and an initial noise power measurement as in 308. For example, in some embodiments, the user device can use the second order envelop mean value ($E_2$) to estimate the initial signal power measurement and can use the fourth order envelop mean value ($E_3$) to estimate the initial noise power measurement. In some embodiments, the user device can estimate an SINR measurement by dividing the initial signal power measurement by the initial noise power measurement.

Next, the method 300 can include the user device using the first order envelop mean value ($E_1$) and the second order envelop mean value ($E_2$) to refine the initial signal power measurement and the initial noise power measurement as in 310. For example, in some embodiments, the user device can use the first order envelop mean value ($E_1$) to identify a second signal power measurement and can use the second order envelop mean value ($E_2$) to identify a second noise power measurement. In these embodiments, the user device can calculate a refined signal power measurement by calculating an average between the initial signal power measurement and the second noise power measurement and can calculate a refined noise power measurement by calculating an average between the initial noise power measurement and the second noise power measurement. Said differently, the user device can calculate the refined signal power measurement by finding an average between the second order envelop mean value ($E_2$) and the first order envelop mean value ($E_1$) and can calculate the refined noise power measurement by finding an average between the fourth order envelop mean value ($E_3$) and the second order envelop mean value ($E_2$).

Finally, the method 300 can include the user device calculating, refining, and/or outputting the SINR measurement as in 312. For example, in some embodiments, the user device can calculate or refine the SINR measurement by dividing the refined signal power measurement by the refined noise power measurement.

In some embodiments, the user device can execute the method 300 repeatedly such that the method 300 can be executed for every arbitrary symbol of every wireless signal received by the user device.

Figure 4:
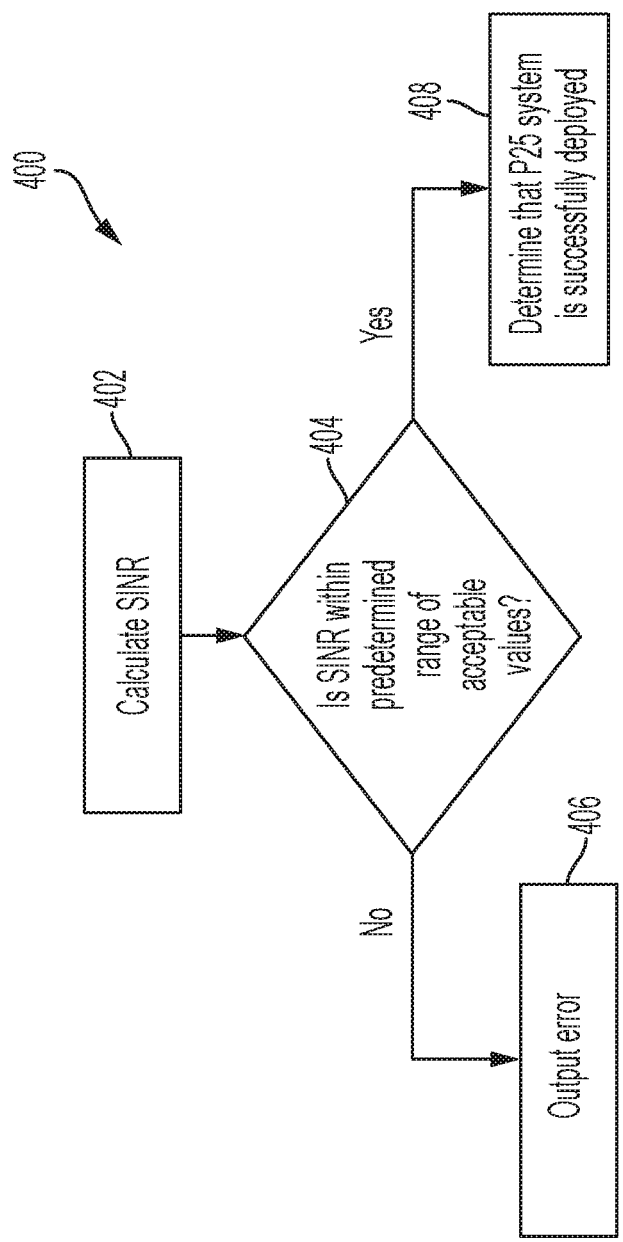
FIG. 4 is a flow diagram of a method in accordance with disclosed embodiments.

FIG. 4 is a flow diagram of a method 400 in accordance with disclosed embodiments. As shown in FIG. 4, the method 400 can include a user device (e.g. the user device 200) calculating an SINR measurement for an oversampled wireless signal as in 402. For example, the user device can calculate the SINR measurement according to the method 300 of FIG. 3. After calculating the SINR measurement as in 402, the method 400 can include the user device determining whether the SINR measurement falls within a predetermined range of acceptable values as in 404. For example, the predetermined range of acceptable values can be between −30 and +60 decibels.

If the user device determines that the SINR measurement falls outside of the predetermined range of acceptable values as in 404, then the method 400 can include the user device outputting an error message or signal indicating that the user device has not been successfully deployed and cannot receive clear wireless signals as in 406. Conversely, if the user device determines that the SINR measurement falls within the predetermined range of acceptable values as in 404, then the method 400 can include the user device outputting a successful deployment message or signal indicating that the user device has been successfully deployed as in 408. When successfully deployed, the user device can send and receive wireless signals reliably.

Embodiments disclosed and described herein solve a major problem of the prior art, namely, a P25 receiver accurately calculating SINR measurements for P25 signals with low computational complexity. For example, in accordance with disclosed embodiments, after frame synchronization, an SINR measurement can be calculated using a lower sampling rate than is known in the prior art, thereby requiring less processing than required by systems and methods known in the art. As such, the SINR measurements for the P25 signals can be calculated using minimal computational resources, thereby improving the functioning of the P25 receiver.

Although a few embodiments have been described in detail above, other modifications are possible. For example, the steps described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
a user device calculating a first order envelop mean value for an oversampled wireless signal received by the user device;
the user device calculating a second order envelop mean value for the oversampled wireless signal;
the user device calculating a fourth order envelop mean value for the oversampled wireless signal;
the user device using the fourth order envelop mean value and the second order envelop mean value to estimate a signal-to-interference-plus-noise ratio (SINR) measurement for the oversampled wireless signal; and
the user device using the first order envelop mean value and the second order envelop mean value to refine the SINR measurement.

2. The method of claim 1 further comprising synchronizing a frame pattern of the oversampled wireless signal to find frame and symbol timing.

3. The method of claim 1 wherein the first order envelop mean value ($E_1$) is calculated as follows:

$$E_1 \triangleq E[|y|] = \sqrt{N\pi/2} \exp\left(-\frac{S}{2N}\right)\left[\left(1 + \frac{S}{N}\right)I_0\left(\frac{S}{2N}\right) + \frac{S}{N}I_1\left(\frac{S}{2N}\right)\right]$$

where S is a true signal power, N is a true noise power, $I_0(\bullet)$ is a Bessel function of the first kind with order 0, $I_1(\bullet)$ is a Bessel function of the first kind with order 1, and y is a column vector composed of $y(nT_s)$.

4. The method of claim 3 wherein the second order envelop mean value ($E_2$) is calculated as follows:

$$E_2 \triangleq \frac{1}{N_s} E[y^H y] = S + N$$

where $N_s$ is an arbitrary number of oversampled received signal samples and $(\bullet)^H$ represents a Hermitian transpose operator.

5. The method of claim 4 wherein the fourth order envelop mean value ($E_3$) is calculated as follows:

$$E_3 \triangleq \frac{1}{N_s} E[(y^H y)^2] = S^2 + 4SN + 2N^2.$$

6. The method of claim 1 wherein estimating the SINR measurement for the oversampled wireless signal comprises:
the user device using the second order envelop mean value to calculate an initial signal power measurement;
the user device using the fourth order envelop mean value to calculate an initial signal noise measurement; and
the user device estimating the SINR measurement by dividing the initial signal power measurement by the initial noise power measurement.

7. The method of claim 6 wherein refining the SINR measurement for the oversampled wireless signal comprises:
the user device using the first order envelop mean value to calculate a second signal power measurement;
the user device using the second order envelop mean value to calculate a second signal noise measurement;
the user device calculating a first average between the initial signal power measurement and the second signal power measurement;
the user device calculating a second average between the initial noise power measurement and the second noise power measurement; and
the user device refining the SINR measurement dividing the first average by the second average to calculate the SINR measurement.

8. The method of claim 1 further comprising:
the user device determining whether the SINR measurement falls within a range of acceptable values; and the user device determining that the user device has been successfully deployed when the SINR measurement falls within the range of acceptable values.

9. The method of claim 8 wherein the range of acceptable values is between −30 and +60 decibels.

10. A system comprising:
a wireless communication interface of a user device that receives an oversampled wireless signal; and
a processor coupled to the wireless communication interface and configured to calculate a first order envelop mean value for the oversampled wireless signal, calculate a second order envelop mean value for the oversampled wireless signal, calculate a fourth order envelop mean value for the oversampled wireless signal, use the fourth order envelop mean value and the second order envelop mean value to estimate a signal-to-interference-plus-noise ratio (SINR) measurement for the oversampled wireless signal, and use the first order envelop mean value and the second order envelop mean value to refine the SINR measurement.

11. The system of claim 10 wherein the processor is further configured to synchronize a frame pattern of the oversampled wireless signal to find frame and symbol timing.

12. The system of claim 10 wherein the processor is further configured to calculate the first order envelop mean value ($E_1$) as follows:

$$E_1 \triangleq E[|y|] = \sqrt{N\pi/2}\exp\left(-\frac{S}{2N}\right)\left[\left(1+\frac{S}{N}\right)I_0\left(\frac{S}{2N}\right)+\frac{S}{N}I_1\left(\frac{S}{2N}\right)\right]$$

where S is a true signal power, N is a true noise power, $I_0(\bullet)$ is a Bessel function of the first kind with order 0, $I_1(\bullet)$ is a Bessel function of the first kind with order 1, and y is a column vector composed of $y(nT_s)$.

13. The system of claim 12 wherein the processor is further configured to calculate the second order envelop mean value ($E_2$) as follows:

$$E_2 \triangleq \frac{1}{N_s}E[y^H y] = S + N$$

where $N_s$ is an arbitrary number of oversampled received signal samples and $(\bullet)^H$ represents a Hermitian transpose operator.

14. The system of claim 13 wherein the processor is further configured to calculate the fourth order envelop mean value ($E_3$) as follows:

$$E_3 \triangleq \frac{1}{N_s}E\left[(y^H y)^2\right] = S^2 + 4SN + 2N^2.$$

15. The system of claim 10 wherein the processor is further configured to use the second order envelop mean value to calculate an initial signal power measurement using the second order envelop mean value, use the fourth order envelop mean value to calculate an initial signal noise measurement and estimate the SINR measurement by dividing the initial signal power measurement by the initial noise power measurement.

16. The system of claim 15 wherein the processor is further configured to use the first order envelop mean value to calculate a second signal power measurement, use the second order envelop mean value to calculate a second signal noise measurement, calculate a first average between the initial signal power measurement and the second signal power measurement, calculate a second average between the initial noise power measurement and the second noise power measurement, and refine the SINR measurement by dividing the first average by the second average to calculate the SINR measurement.

17. The system of claim 10 wherein the processor is further configured to determine whether the SINR measurement falls within a range of acceptable values and determine that the user device has been successfully deployed when the SINR measurement falls within the range of acceptable values.

18. The system of claim 17 wherein the range of acceptable values is between −30 and +60 decibels.

19. A non-transitory machine-readable medium comprising instructions, which, when executed by one or more processors, cause the one or more processors to perform the following operations:
calculate a first order envelop mean value for an oversampled wireless signal received by a user device;
calculate a second order envelop mean value for the oversampled wireless signal;
calculate a fourth order envelop mean value for the oversampled wireless signal;
use the fourth order envelop mean value and the second order envelop mean value to estimate a signal-to-interference-plus-noise ratio (SINR) measurement for the oversampled wireless signal; and
use the first order envelop mean value and the second order envelop mean value to refine the SINR measurement.

20. The non-transitory machine-readable medium of claim 19 wherein the instructions, when executed by the one or more processors, cause the one or processors to determine whether the SINR measurement falls within a range of acceptable values and determines that the user device has been successfully deployed when the SINR measurement falls within the range of acceptable values.

* * * * *